March 16, 1965  E. V. ENGLEMAN, SR  3,173,209
GAUGE FOR TROUSERS OR THE LIKE
Filed May 9, 1962

INVENTOR
EUGENE V. ENGLEMAN, SR.
BY Jacobi & Davidson
ATTORNEY

United States Patent Office 3,173,209
Patented Mar. 16, 1965

3,173,209
GAUGE FOR TROUSERS OR THE LIKE
Eugene Valentine Engleman, Sr., Rte. 1, Lexington, Va.
Filed May 9, 1962, Ser. No. 193,436
1 Claim. (Cl. 33—8)

The present invention relates to a gauge for trousers or the like, and more particularly to a gauge for trousers which will permit the determining of the desired length of the trousers without requiring the tailor to bend over or stoop down during the measuring process, and which will permit a direct reading of length variations for styling.

Trousers are usually manufactured in large lots, varying in size at the waist to enable men and boys to select trousers of the proper girth size. The trousers do not have cuffs on them, so that the purchaser may select the girth size and then be measured for the proper length of the trouser leg.

Obtaining the proper trouser length is an inconvenient and often inexact procedure. Typically, a tape measure is used by the tailor, who holds one end of the tape at the crotch of the trousers while they are being worn by the customer, and the other end of the tape is held adjacent the heel of the customer's shoe. This necessarily requires that the tailor be in a stooped over or crouched position, usually with one knee on the floor. At this point, the customer is asked about the styling length, as different people desire different trouser lengths. For example, trouser styling may provide that the bottom of the cuff just touches the top of the shoe, or that the trouser cuff be slightly longer, so that a partial "break" is obtained, or that the trouser be even longer, extending to the top of the heel lift, to thereby obtain a full "break."

When the customer indicates his preference, the tailor then adjusts the tape measure, or the position of his thumb on the tape measure, in accordance with the indication given by the customer. As will be appreciated, the tailor, while in the uncomfortable bent over or crouched position, may not be able to determine with sufficient exactitude the change in the indicated trouser length to accommodate the indicated length to the styling requirements voiced by the customer.

While trouser gauges have heretofore been proposed to replace the tape measure, they have not, in general, been able to overcome the deficiencies noted hereinabove.

An object of the present invention is to provide a trouser gauge for measuring the length of trousers.

Another object of the present invention is the provision of a trouser gauge which will enable the measurement of trouser length without requiring the tailor to assume a stooped, bent over or crouched position.

Yet another object of the present invention is to provide a trouser gauge which will enable the direct reading of variations of trouser lengths to conform to the styling desired by the customer.

A further object of the present invention is the provision of a trouser gauge incorporating a handle to enable the gauge to be readily manipulated.

A still further object of the present invention is to provide a trouser gauge which may be readily adjusted to conform to the height of the customer, and to be held in the adjusted position once the desired position has been obtained.

Another object of the present invention is the provision of a trouser gauge which is economical to manufacture and which is both strong and durable in construction.

Other objects and many of the attendant advantages of the present invention will be readily understood from the following specification and drawings, wherein.

Figure 1:
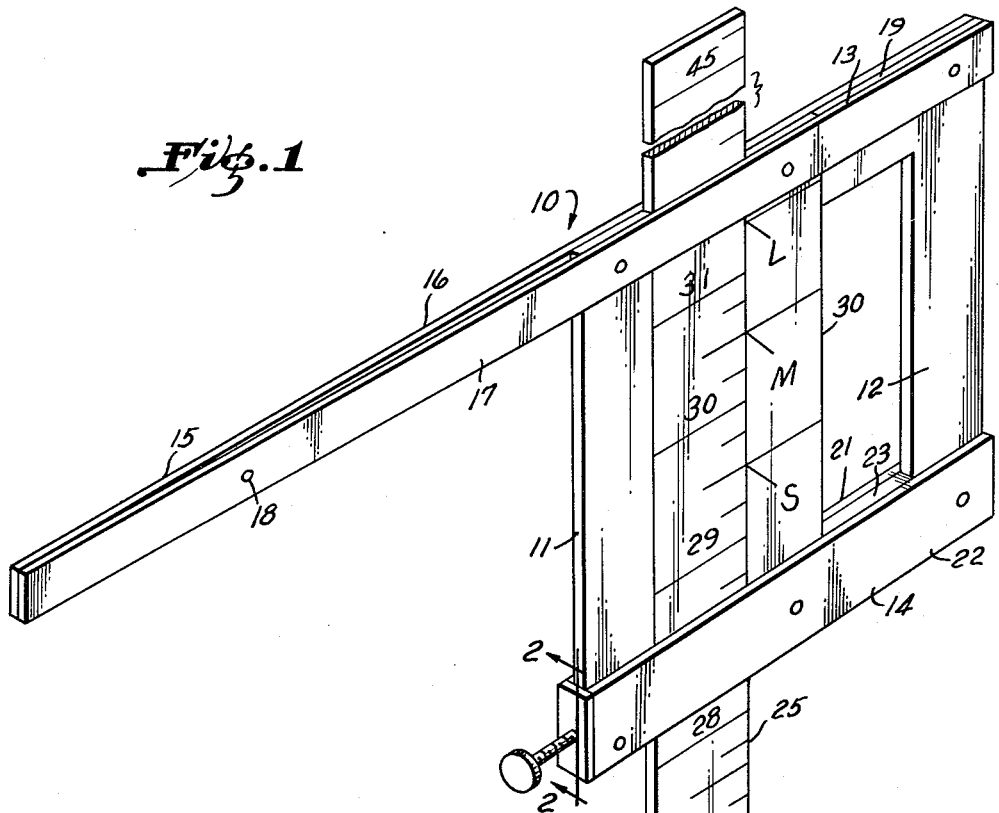
FIG. 1 is a perspective view, with parts broken away, of a trouser gauge in accordance with the present invention.

Referring now to the drawings, wherein like or corresponding reference numerals are used to designate like or corresponding parts throughout the several views, there is shown in FIG. 1 a trouser gauge generally designated 10, the gauge comprising spaced parallel members 11 and 12 and a second set of spaced parallel members 13 and 14 at right angles to members 11 and 12, the member 12 serving as a handle having a bight portion spaced laterally from guide members 11 and 30 and extending between parallel members 13 and 14. These members comprise a generally rectangular frame, as shown. Extending from the frame is a sensing arm 15, and in the preferred embodiment, as shown in the drawings, the sensing arm 15 is made up of two parallel strips 16 and 17 which are in fact continuations of the member 13. At their outer end, the strips 16 and 17 are secured together, as by rivet 18, and where the strips 16 and 17 constitute the frame member 13, they are spaced apart by a spacer 19 between them.

The lower member 14 may also comprise two spaced apart strips 21 and 22 with a spacer 23 between them.

A standard 25 extends through the frame, and in particular extends between the strips 16 and 17 on the one hand and between the strips 21 and 22 on the other hand. Standard 25 has a scale 50 thereon, as shown, and where the English system is in use, this will be an "inch" scale. Standard 25 is slightly less in thickness than the spacers 19 and 23, and is guided in the frame by an edge of the member 11.

Also guiding the standard 25 is an auxiliary scale member 30 which extends within the frame parallel to the members 11 and 12 and between the members 13 and 14, auxiliary scale member 30 being of substantially the same thickness as spacers 19 and 23. Auxiliary scale member 30 is spaced from member 12, and thus member 12 may serve as a handle for the gauge.

The auxiliary scale member 30 has auxiliary scale markings thereon, and in the embodiment shown on the drawings these markings are designated "L," "M," and "S," these markings indicating trouser length of long, medium, and short, respectively.

As will be understood, the standard 25 extends between the facing edges of member 11 and auxiliary scale member 30, and is guided thereby, these members maintaining the standard substantially perpendicular to the sensing arm 15.

Figure 2:
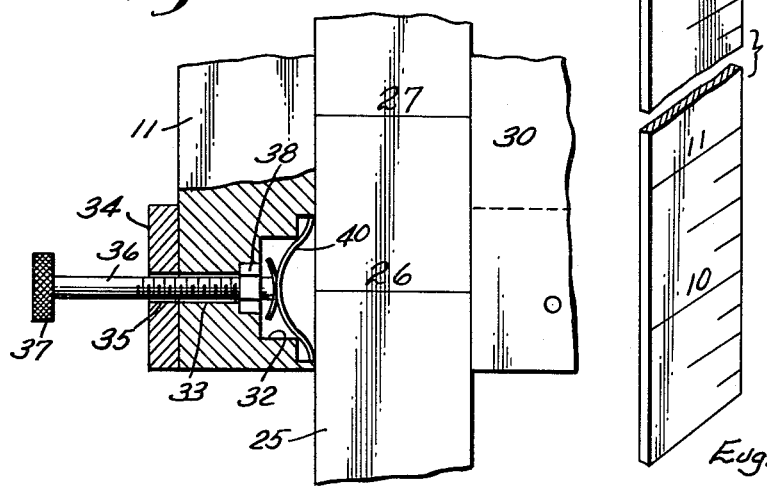
FIG. 2 is a fragmentary cross-sectional view taken on the line 2—2 of FIG. 1.

Referring now to FIG. 2, it will be seen that the member 11 has a recess 32 at its lower end, which communicates with a bore 33. An end plate 34 having a bore 35 lies outwardly of the member 11, and a screw 36 with a knob 37 extends through the bores 32 and 33. A nut 38 is lodged in the recess 32, and threadably receives the screw 36. In abuting relationship with the end of the screw 36 is a leaf spring 40 which is in the recess 32, the ends of leaf spring 40 being in engagement with standard 25, and urging standard 25 against the edge of auxiliary scale member 30. As will be understood, by rotating the knob 37, the tension on leaf spring 40 may be varied to vary the effective spring force acting against the standard 25, to thereby permit it to slide more or less easily, or to hold it in position.

In operation, the person purchasing the trousers will be wearing the trousers, and the trousers will not have cuffs thereon. The screw 36 will be rotated so that the standard 25 can be slidably moved relatively to the frame of the gauge, and the lower end of standard 25 will be placed on the floor opposite the customer and with the sensing arm 15 extending between the customer's legs.

The entire frame and sensing arm 15 will be moved upwardly, sliding on standard 25, until the upper surface of sensing arm 15 engages with the crotch of the trousers. The customer may then be requested to designate the styling length, and the tailor will read the desired length in accordance with the indication given by the scale on the auxiliary scale member 30. For example, if the customer desires the trousers to be relatively short, then the tailor will, with the gauge set as in FIG. 1, call off the measurement of 29½ inches. If a medium length is desired, the tailor will read the length as 30½ inches, as indicated by the scale mark for "M." And if a long trouser length is desired, the tailor will directly read the measurement as 31½ inches.

As will be understood, the gauge 10 may be carried about by the member 12, which constitutes a handle, and the entire frame may be moved on the standard 25 by grasping the member 12.

As will be further understood, the standard 25 and the auxiliary scale member 30 may have scales on both sides thereof to permit the trouser gauge 10 to be used and viewed from either side. In addition, the trouser gauge 10 may be used to measure the height of the waist band from the top of the shoe heel, where such a measurement is desired. Further, the gauge 10 may be used for measuring the height of skirts' waistbands and hems above the floor.

Gauge 10 may be fabricated from economical, readily available materials, such as wood, plastic, or metals such as aluminum. It may be assembled with known securing means, such as rivets and screws.

There has been provided a gauge for measuring trousers which will enable measurement without stooping, bending or crouching and will enable direct reading of variations in desired trouser lengths to conform to styling variations. The gauge of the present invention may be readily manipulated by the handle provided and may be readily adjusted and held in adjusted position, as desired. It will be further understood that the trouser gauge of the present invention may be fabricated in a most economical manner and will be strong and durable in use.

It will be obvious to those skilled in the art that various changes may be made without departing from the spirit of the invention and therefore the invention is not limited to what is shown in the drawings and described in the specification but only as indicated in the appended claim.

What is claimed is:

A measuring gauge for garments comprising an elongated bar standard, frame means adjustably slidable on said standard, said standard having a scale on at least one face thereof, said frame means comprising first and second pairs of coextensive horizontally disposed and vertically spaced apart members, first vertical guide means extending between said first and second pairs of horizontal members and secured thereto between the spacing defined by opposed members of each pair of said horizontal members, said first guide means slidably engaging one side of said standard, second vertical guide means extending between said first and second pairs of horizontal members within said spacing between the opposed members of each of said pairs of horizontal members and disposed in spaced parallel relation to said first guide means for slidably engaging the opposite side of said standard, said second guide means having a plurality of indices on at least one face thereof cooperating with said scale on said standard for indicating a desired length for a garment, a handle member having the bight portion thereof spaced laterally from said first and second guide means and extending between said first and second pairs of horizontal members, a pair of spacers, each of said spacers being disposed between the opposed members of said first and second pairs of horizontal members and between said handle member and said second guide means respectively, spring means mounted on said first guide means for operatively engaging said standard so as to maintain said frame means in a desired position relative to said standard, means for adjusting the force of said spring means on said standard, said second pair of coextensive horizontal members having a greater length than said first pair for providing a sensing arm on said frame means.

References Cited by the Examiner
UNITED STATES PATENTS

| | | | |
|---|---|---|---|
| 496,150 | 4/93 | Cloud | 33—8 |
| 1,098,491 | 6/14 | Gates | 33—9 |
| 1,119,577 | 12/14 | Cweik | 33—9 |
| 1,795,973 | 3/31 | Sobel | 33—9 |
| 2,112,928 | 4/38 | Shulman et al. | 33—8 |
| 3,088,208 | 5/63 | Mitchell | 33—2 |

ISAAC LISANN, *Primary Examiner.*